United States Patent Office 2,749,359
Patented June 5, 1956

2,749,359

HYDROGENATION OF DICYANOBUTENE IN THE PRESENCE OF A NEUTRALIZED PALLADIUM CATALYST

William H. Calkins and Donald E. Welton, Victoria, Tex., assignors to E. I. du Pont de Nemours and Company, Wilmington, Del., a corporation of Delaware No Drawing. Application January 6, 1953, Serial No. 329,932

5 Claims. (Cl. 260—465.8)

This invention relates to the preparation of supported catalysts. More particularly, this invention relates to the preparation of palladium catalysts supported on a charcoal carrier.

The selection, treatment, and employment of catalysts has not reached the stage of other fields of research wherein predicted results may be obtained. The activity, selectivity, and general performance of a catalyst depend on many factors, some of which may be known while many of such factors are unknown. Some factors which may affect the performance of a catalyst are the microstructure of the catalytic surface, the purity of the catalyst material, the nature and purity of the catalyst support, the pH of the catalyst and its support, the reaction of the catalyst to the action of poisoning materials, etc. Moreover, it is well recognized that there may be many other unknown factors affecting the efficiency of a particular catalyst employed in a specific process.

Palladium catalysts are employed in many known hydrogenation processes. In U. S. Patents 2,532,311 and 2,532,312, there are described and claimed processes for hydrogenating 1,4-dicyanobutene to adiponitrile in the presence of a palladium-supported catalyst. The present invention, in one embodiment, deals with the preparation of an improved catalyst which may be employed in processes such as those claimed in U. S. Patents 2,532,311, and 2,532,312. These patents describe and claim either a vapor-phase or a liquid-phase process wherein hydrogen and 1,4-dicyanobutene are reacted in the presence of a palladium catalyst to produce adiponitrile. In the vapor-phase process, which is the preferred process, one mole of 1,4-dicyanobutene is reacted with at least one mole (preferably 10–100 moles) of hydrogen at 0.5 to 5.0 atmospheres pressure and 200° C. to 350° C. in the presence of a catalyst comprising palladium metal on coconut charcoal.

In the process of hydrogenating 1,4-dicyanobutene to adiponitrile, it has been found that undesirable side reactions may take place with the employment of palladium catalysts prepared in certain ways. It likewise has been found that some palladium catalysts produce higher yields of adiponitrile than others. The catalyst prepared in accordance with the description found in the beforementioned U. S. Patent 2,532,311 is not as active as those produced by other methods, because the procedure described results in forming a catalyst in which the pores of the charcoal are filled with palladium thus causing the catalyst to have less than its maximum catalytic efficiency. Catalysts of coconut charcoal treated with palladium in such a manner that the palladium is substantially completely deposited on the surface of the charcoal, wihout filling the interstices of the charcoal, have been found to be far superior in efficiency in the hydrogenation of 1,4-dicyanobutene to adiponitrile.

In U. S. Patent 2,475,155, there is described and claimed a process for preparing a supported palladium catalyst which is alkaline. In such a process, the palladium is deposited on the surface of the support as an oxide or hydroxide. Catalysts prepared in this manner are known to be very active and to have a long service life. However, when such catalysts are used in the process of hydrogenating 1,4-dicyanobutene to adiponitrile, undesirably large quantities of 2-cyanocyclopentylidenimine appear as a byproduct. Moreover, it is extremely difficult to efficiently and economically separate this by-product impurity from the adiponitrile produced.

It is an object of this invention to produce a hydrogenation catalyst which is highly active, has a long service life, and yet is sufficiently selective to minimize the formation of undesirable by-products. It is a further object of this invention to provide a method for preparing a palladium catalyst supported on the surface of coconut charcoal which will effect the hydrogenation of 1,4-dicyanobutene to adiponitrile without producing any substantial amounts of 2-cyanocyclopentylidenimine. Other objects will be apparent to those skilled in the art from the detailed description given herein.

The above objects are accomplished by subjecting an active palladium catalyst containing basic substances to a treatment with acid and water. For example, an alkaline palladium catalyst may result from a treatment of 8–10 mesh coconut charcoal with bicarbonate of soda and a wetting agent, followed by the addition of an aqueous solution of a palladium salt to cause precipitation of palladium oxide or hydroxide, which is then reduced and dried to leave palladium metal deposited on the surface of coconut charcoal. Such a catalyst as just described may produce as much as 1000 to 2000 p. p. m. or more 2-cyanocyclopentylidenimine during the hydrogenation of 1,4-dicyanobutene to adiponitrile. However, if the above described catalyst is washed with distilled water then washed with an acid, for example nitric, sulfuric, formic, acetic, or others, and finally washed with distilled water and dried, the catalyst exhibits a high activity in producing adiponitrile in the above process and yet produces only 100–400 p. p. m. of 2-cyanocyclopentylidenimine.

The following examples are set forth to describe this invention more fully.

*Example 1.*—Comparison experiments were made on a palladium catalyst to show the reduction in by-product formation following the process of this invention.

A sample of palladium catalyst composition comprised of palladium metal deposited on the surface of coconut charcoal was selected and divided into two portions. This catalyst sample was tested and found to have 9 milli-equivalents of alkali per 25 grams of catalyst. One of the two catalyst portions was not further treated, while the other portion was washed with 4 volumes of distilled water per volume of catalyst, then contacted with an equal volume of 1 N. nitric acid for 30 minutes, and finally, washed again with 4 volumes of distilled water and dried. The acid-treated portion had no measurable amount of alkali. Each of the palladium catalyst portions was subsequently used in a series of experiments to catalyze a vapor phase hydrogenation of 1,4-dicyanobutene to adiponitrile in an identical manner. The untreated catalyst portion formed an adiponitrile product containing as much as 1066 p. p. m. of 2-cyanocyclopentylidenimine. The acid-treated catalyst portion formed an adiponitrile product containing no more than 336 p. p. m. of 2-cyanocyclopentylidenimine. A sample from the same original catalyst lot was subjected to a washing with distilled water only and then used in the preparation of adiponitrile, with the result that 1314 p. p. m. of 2-cyanocyclopentylidenimine was formed in the product.

*Example 2.*—A commercial palladium-on-coconut-charcoal catalyst was tested and found to contain 9 milli-equivalents of alkali per 25 grams of catalyst. A 100-gram sample of this catalyst was treated by the following successive steps:

(1) The catalyst sample was covered with 100 grams of distilled water for 15 minutes, and then the water was drained off.

(2) The catalyst was washed with 100 grams of 6 N. formic acid at room temperature for 30 minutes. The acid was then drained off.

(3) The catalyst was washed with successive 100 ml. portions of distilled water, 1 N. ammonium hydroxide, and twice with distilled water.

(4) The catalyst was dried and reduced in a stream of hydrogen.

Tests were made using the catalyst in a vapor phase process for hydrogenating 1,4-dicyanobutene to adiponitrile. The catalyst, before receiving the acid treatment described, produced more than 1000 p. p. m. of 2-cyanocyclopentylidenimine as a by-product impurity. The treated catalyst produced 234 p. p. m. of the same imine by-product.

In the same manner as described above, a palladium-on-alumina catalyst was treated and tested for effectiveness. The catalyst was a commercial product containing approximately 0.2% by weight of palladium coated on alumina particles. One sample was treated with formic acid and washed with water and with ammonium hydroxide as described above, while the other sample was untreated. These two catalyst samples were then used in the process of vapor phase hydrogenation of 1,4-di cyanobutene to adiponitrile. Analyses of the product vapors from the two catalyst samples were made at identical times as the catalystic reaction proceeded, to determine the amount of 2-cyanocyclopentylidenimine present as an undesirable by-product. Each of the four analyses tabulated below show the lower by-product formation in the acid-treated catalyst.

Table

| Analysis | Amount of 2-Cyanocyclopentylidenimine in Product, p. p. m. | |
|---|---|---|
| | Untreated Catalyst | Acid-treated Catalyst |
| 1 | 2,730 | 1,094 |
| 2 | 1,277 | 671 |
| 3 | 1,048 | 376 |
| 4 | 717 | 398 |

*Example 3.*—A palladium-on-charcoal catalyst was prepared as follows:

Twenty-five grams of coconut charcoal were boiled for 15 minutes in a solution comprised of 180 grams of distilled water and 20 grams of sodium bicarbonate. After the period of boiling, the solution was poured off the charcoal. The charcoal was then washed with 50 ml. of distilled water, which was then poured off. To the charcoal there was then added 25 ml. of a palladium chloride solution (0.1 gram of palladium chloride in 24.9 grams of distilled water) and the mixture was boiled gently for 15 minutes. The charcoal was removed from the solution, dried, and reduced in hydrogen.

When the above-described catalyst was used in the process of hydrogenating 1,4-dicyanobutene to adiponitrile, there was present in the product 608 p. p. m. of 2-cyanocyclopentylidenimine.

A second batch of catalyst prepared exactly as described above was subjected to the further treatment of washing with 4 volumes of distilled water per volume of catalyst, contacting with 1 volume of 1 N. nitric acid for 30 minutes, and washing again with 4 volumes of distilled water, followed by drying and reducing with hydrogen. When this catalyst was utilized in the process of hydrogenating 1,4-dicyanobutene to adiponitrile, there were present in the product 390 p. p. m. of 2-cyanocyclopentylidenimine.

*Example 4.*—A sample of palladium-on-coconut-charcoal catalyst was treated in the same manner as described in Example 1, except that 1 N. acetic acid was used in place of nitric acid. The control sample was treated with water as described in Example 1. When utilized in the hydrogenation of 1,4-dicyanobutene to adiponitrile, the control sample produced over 1000 p. p. m. of 2-cyanocyclopentylidenimine while the acid-treated sample produced 296 p. p. m. of the same imine.

*Example 5.*—In the same manner as described in Example 1, two samples of palladium-on-coconut-charcoal catalyst were prepared, except that the acid treatment was performed with 1 N. sulfuric acid rather than nitric acid. When the two catalyst samples were used to hydrogenate 1,4-dicyanobutene to adiponitrile, the control sample produced over 1000 p. p. m. of 2-cyanocyclopentylidenimine while the treated sample produced 122 p. p. m. of the same imine.

Palladium-on-charcoal catalysts may be prepared according to the description given in Example 3 above, according to U. S. Patent 2,475,155, or by other known means. Depending on the reagents used and on other factors of the preparation, the above procedures may result in a catalyst which is alkaline. Acid-treatment has been found to produce a more selective catalyst for many hydrogenation reactions, particularly the hydrogenation of 1,4-dicyanobutene to adiponitrile.

Palladium-on-charcoal catalysts bought on the open market may have a pH as high as 10 or more. So far as is known, such an alkalinity is a necessary result in the production of a desirable catalyst having the proper surface characteristics for imparting high activity and long service life. The process of this invention further treats this type of catalyst so that it is highly selective as well as highly active.

The acid which is used in the process of this invention may be any of several kinds of acids. Generally, a strong acid is preferable, i. e., one having an acidic dissociation constant no less than $10^{-5}$. Thus nitric acid, acetic acid, sulfuric acid, hydrochloric acid, formic acid, and others are operable. In the particular embodiment described in the examples, treatment of palladium-on-charcoal catalysts for eventual use in the hydrogenation of 1,4-dicyanobutene to adiponitrile, formic acid has been found particularly effective and is the preferred acid.

The strength of the acid and the time of washing with acid are cooperative factors. The strength of the acid must be sufficient to counteract the residual basic substances on the catalyst. For this purpose an acid having a normality from about 0.1 to about 7.0 is adequate for this invention if the time during which the catalyst is in contact with the acid is of sufficient length. For a 1.0 Normal acid, the time of acid contact should be about 30 minutes. If the acid is weaker than 1.0 Normal, the contact time should be longer, and if the acid is stronger than 1.0 Normal the contact time may be shorter. In general, the acid contact time may vary from 1 minute up to 2 hours or more in different embodiments of this invention. The normality of nitric acid which is used is from 1 to 2, while the normality of formic acid is from 4 to 7 in the preferred embodiment of this invention.

Although nitric acid is utilized in many applications of this invention, it has been found that a palladium-on-coconut-charcoal catalyst treated with formic acid will produce a large amount of product per pound of catalyst when utilized in the vapor phase hydrogenation of 1,4-dicyanobutene to adiponitrile. Therefore formic acid is the preferred acid for preparing such a catalyst to be more selective and to have a longer life when utilized in the vapor phase hydrogenation of 1,4-dicyanobutene to adiponitrile.

The process of this invention is applicable to the treatment of any catalyst support which may have an undesirable alkalinity. Other supporting materials such as kieselguhr, silica, silica gel, alumina, charcoal, etc. are often coated with catalytic metals for use in reactions involving hydrogenation, dehydrogenation, reforming, hydrating, dehydrating, oxygenating, and other conversion processes. Any of these reactions may be subject to the purity of the catalyst and its support, and if alkalinity is the impurity, the process of this invention may be utilized to treat the catalyst so as to eliminate the alkalinity and thus improve the catalytic conversion, both as to service like and selectivity.

It may be undesirable to have any acid residue remaining on the catalyst after treatment by the process of this invention. If such is the case, the acid washing can be followed by a neutralizing wash by a base such as ammonium hydroxide, which can in turn be removed by subsequent washing with water. An experiment was performed using the above technique of acid washing followed by base washing and water washing, to give a catalyst comparable in selectivity and activity to those described in the examples.

We claim:

1. The process of producing adiponitrile in a gas-phase, catalytic hydrogenation reaction which comprises forming a gaseous mixture of 1,4-dicyanobutene and from 10 to 100 mols of hydrogen per mol of 1,4-dicyanobutene; and passing said mixture, at a pressure of 0.5 to 5.0 atmospheres and at a temperature of 200° C. to 350° C., in contact with a palladium-on-coconut-charcoal catalyst prepared by depositing palladium on the surface of alkaline coconut charcoal particles, treating the palladium-coated catalyst by washing with formic acid followed by washing with water, drying the catalyst, and reducing the dried catalyst with hydrogen.

2. The process of claim 1 in which the formic acid has a normality from 4 to 7.

3. A process for converting 1,4-dicyanobutene to adiponitrile in a vapor-phase reaction comprising passing a gaseous mixture of hydrogen and 1,4-dicyanobutene over a supported palladium catalyst which is free of any titratable alkalinity on the catalyst surface.

4. A process for hydrogenating 1,4-dicyanobutene to produce adiponitrile in a vapor-phase reaction comprising passing a mixture of vapors of hydrogen and 1,4-dicyanobutene over a catalyst of palladium metal supported on charcoal which catalyst has been treated to remove all residual titratable alkalinity from its surface by washing the supported catalyst with water and with an acid having a dissociation constant of at least $10^{-5}$.

5. The process of claim 4 wherein the catalyst support is coconut charcoal and the acid is formic acid.

References Cited in the file of this patent

UNITED STATES PATENTS

| | | |
|---|---|---|
| 2,006,221 | Ridler | June 25, 1935 |
| 2,006,222 | Ridler | June 25, 1935 |
| 2,344,208 | Kirkpatrick | Mar. 14, 1944 |
| 2,400,012 | Littman | May 7, 1946 |
| 2,475,155 | Rosenblatt | July 5, 1949 |
| 2,532,311 | Howk et al. | Dec. 5, 1950 |